US012650108B2

(12) United States Patent
Mitsch

(10) Patent No.: US 12,650,108 B2
(45) Date of Patent: Jun. 9, 2026

(54) ELASTIC ROTARY BEARING FOR TWO-BLADE ROTORS OF WIND TURBINES

(71) Applicant: FM Energie GmbH & Co.KG, Heppenheim (DE)

(72) Inventor: Franz Mitsch, Heppenheim (DE)

(73) Assignee: FM Energie GmbH & Co.KG, Heppenheim (DE)

( * ) Notice: Subject to any disclaimer, the term of this patent is extended or adjusted under 35 U.S.C. 154(b) by 0 days.

(21) Appl. No.: 18/998,269

(22) PCT Filed: Jul. 21, 2023

(86) PCT No.: PCT/EP2023/025345
§ 371 (c)(1),
(2) Date: Jan. 24, 2025

(87) PCT Pub. No.: WO2024/022609
PCT Pub. Date: Feb. 1, 2024

(65) Prior Publication Data
US 2025/0215851 A1     Jul. 3, 2025

(30) Foreign Application Priority Data

Jul. 25, 2022    (EP) ..................................... 22020356

(51) Int. Cl.
*F03D 1/06*        (2006.01)
*F03D 80/70*       (2016.01)

(52) U.S. Cl.
CPC ............. *F03D 1/066* (2023.08); *F03D 80/70* (2016.05); *F05B 2240/50* (2013.01); *F05B 2250/232* (2013.01); *F05B 2260/96* (2013.01); *F05B 2280/5007* (2013.01)

(58) Field of Classification Search
CPC .......... F03D 1/06; F03D 1/066; F03D 1/0658; F03D 1/0662; F03D 80/70; F03D 80/701; F03D 80/703; F16C 27/00; F16C 27/06; F05B 2240/50
See application file for complete search history.

(56) References Cited

U.S. PATENT DOCUMENTS

| | | | | |
|---|---|---|---|---|
| 5,271,678 A | * | 12/1993 | Bourgeot | .................. B61F 5/20 267/140.4 |
| 9,394,937 B2 | * | 7/2016 | Caruso | .................. F16F 1/3935 |
| 11,136,965 B2 | * | 10/2021 | Caruso | .................... F03D 80/70 |

(Continued)

FOREIGN PATENT DOCUMENTS

| | | |
|---|---|---|
| WO | 2010/054808 A1 | 5/2010 |
| WO | 2012/076892 A1 | 6/2012 |

OTHER PUBLICATIONS

International Search Report Corresponding to PCT/EP2023/025345 mailed Nov. 22, 2023.

(Continued)

*Primary Examiner* — Christopher R Legendre
(74) *Attorney, Agent, or Firm* — Secant IP, PLLC

(57)        ABSTRACT

The invention relates to an elastic rotary bearing for two-blade rotors that are used in wind turbines for high load cycles. The invention relates in particular to a new type of rotor hub for, in particular, elastically mounted two-blade rotors of wind turbines into which an elastic rotary bearing is integrated, which in turn is composed of two rotational joint units composed of layer elements and cone elements.

17 Claims, 6 Drawing Sheets

(56) References Cited

U.S. PATENT DOCUMENTS

| 12,018,713 B2* | 6/2024 | Mitsch | F16F 15/22 |
|---|---|---|---|
| 2014/0226926 A1 | 8/2014 | Caruso et al. | |
| 2015/0226186 A1* | 8/2015 | Mitsch | F16C 27/063 |
| | | | 416/134 R |
| 2020/0025175 A1 | 1/2020 | Caruso | |
| 2025/0215851 A1* | 7/2025 | Mitsch | F03D 1/066 |

OTHER PUBLICATIONS

Written Opinion Corresponding to PCT/EP2023/025345 mailed Nov. 22, 2023.

* cited by examiner

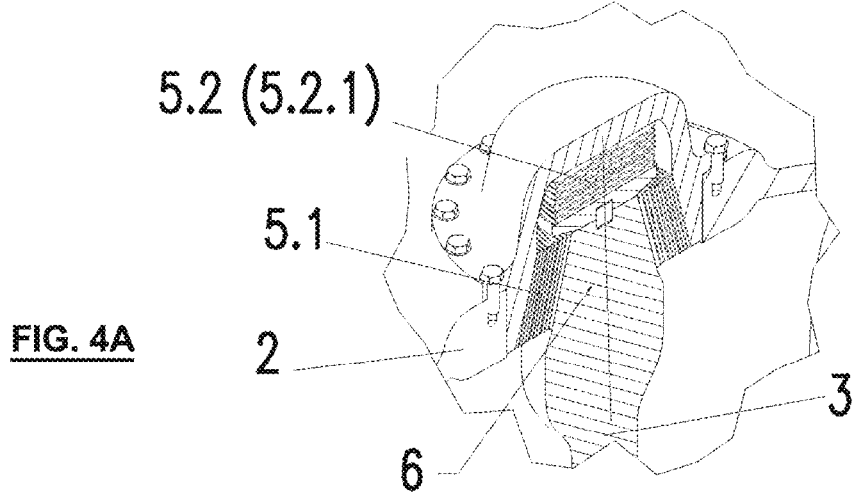
5.2 (5.2.1)
5.1
FIG. 4A
2
6
3
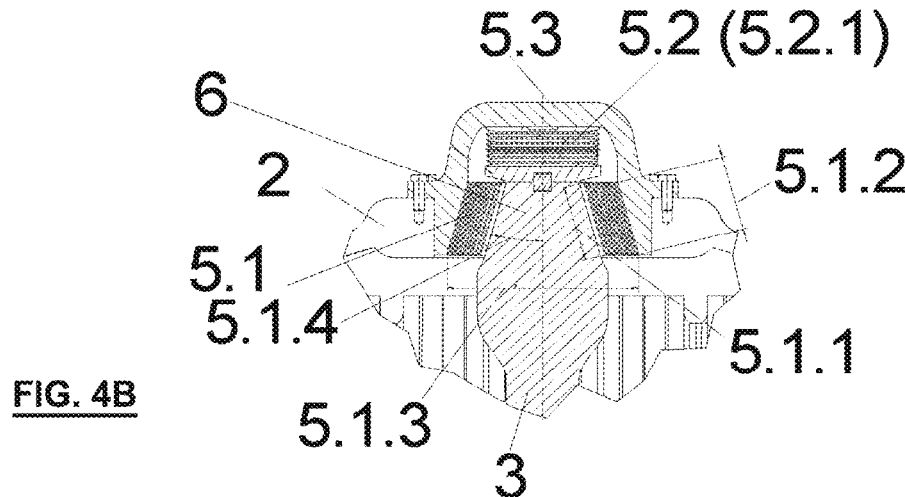
5.3   5.2 (5.2.1)
6
2
5.1
5.1.4
5.1.2
5.1.1
FIG. 4B
5.1.3
3
FIG. 4C
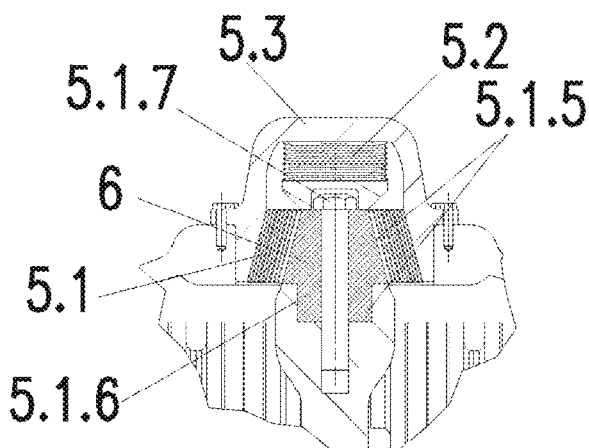
5.1.7
5.3
5.2
5.1.5
6
5.1
5.1.6

ELASTIC ROTARY BEARING FOR TWO-BLADE ROTORS OF WIND TURBINES

The invention relates to an elastic rotary bearing for two-blade rotors that are suitable for high load cycles and are used in wind turbines.

The invention relates in particular to a new type of rotor hub for elastically mounted two-blade rotors of wind turbines into which an elastic rotary bearing for the rotor is integrated.

The invention relates in particular to a corresponding rotor hub, which is designed in such a way that a torsionally elastic element and an axially elastic element are arranged in a small space in such a way that, when simultaneously high axial and radial force acts on the rotor blades during operation, a reversible pendulum motion of the said rotor blades toward the structure of the wind turbine can take place.

Most wind turbines currently installed and constructed have three rotor blades evenly distributed in one plane, such that a largely uniform load occurs with each rotation.

Two-blade rotors, in contrast, are still the exception, since they generate larger alternating loads.

However, particularly in offshore applications, two-blade rotors have the following advantages:

Lower costs due to fewer rotor blades;

Easy transport, since multiple rotors can be stored simultaneously on the transport ship, whereas a three-blade rotor takes up an extreme amount of space when assembled. Therefore, the rotor blades have to be assembled individually, which takes a considerable amount of time;

Easy installation, since the fully assembled rotor can be lifted like a horizontal "joist."

A major disadvantage of two-blade rotors, however, is the uneven load during each rotation of the rotor.

In the case of vertically located rotor blades, vertical shear winds lead to a pitching movement, while horizontal shear winds have little or no influence.

In the case of horizontally located rotor blades, horizontally varying strong winds lead to loads in the yaw direction. At the same time, the moment of inertia of the rotor and thus of the entire system changes permanently during each revolution.

These constant load and inertia changes place considerable loads on all elements following the rotor, such as the rotor hub, rotor shaft, rotor bearings, gearbox, generator and tower.

The influence of the tower shadow also leads to greater loads than is the case with a three-blade rotor.

In order to prevent these loads, it is advisable to mount the rotor in pendulum fashion so that it no longer transmits pitch and yaw forces. Therefore, ideally only the desired torsional forces should be transmitted to drive the generator.

To date, the use of circular elastic bearing elements which allow a pendulum motion of the rotor has been proposed for this purpose.

A known example was implemented in the MOD-2 two-blade wind turbine (Solar Energy Research Institute, 1980, SERI/SP 738-728), in which the circular layer element is arranged in such a way that it substantially absorbs only radial forces. However, in order to transfer the radial loads, this circularly arranged element requires a large diameter, which increases as the system size increases due to higher loads and weights. The thrust movements occurring in the elastomer layers increase with the same angular movement on the required larger diameters, and therefore they can no longer be absorbed by the elastomer elements with reasonable effort. It is not clear from the cited description and the associated drawings whether the elastic layer element of the MOD-2 system is designed in such a way that it can also transmit larger axial forces. Furthermore, the circular layer elements appear to have a large diameter, thus requiring considerable space within the rotor hub.

WO 2012/076892 discloses a rocker bearing, the design of which is not described in more detail, for rotors of wind turbines, using cylindrical and conical elastic stop elements. The rocker bearing permits a rocker angle of +20° to −20° and is arranged in such a way that axial forces can be transmitted only to a small extent.

Elastic bearings that can absorb radial and axial forces are also known in the prior art, but for other technical tasks. For example, WO 2010/054808 describes a machine or gearbox bearing which is a combination of an elastic sandwich bearing with an elastic cone bearing, in which a plurality of such bearings creates a circumferential elastic connection, for example between the rotor shaft and the mainframe of a wind turbine. The cone elements used are designed to be relatively flat, i.e., they have a wider cone angle of up to 50°, since they also have to transmit high axial forces. The cones and the sandwich elements are mounted in such a way that, in accordance with the object to be achieved, they cannot transmit any torsional forces and therefore also no angles of rotation, such as pendulum motions of the rotor.

The object is therefore to provide an elastic bearing for a two-blade rotor, which bearing allows a reversible torsional movement and an angle of rotation of the rotor blades on the smallest possible diameter, or while taking up the smallest possible space within a rotor hub, and is able to absorb radial as well as axial loads in order to keep the deformations—which are dependent on the diameter and angle of rotation—as low as possible. The weight load of a 100-300 t two-blade rotor causes an alternating load in the axial direction of the bearing with each rotation of the rotor. Offshore systems in particular have to be maintenance-free over their entire service life of at least 30 years. Since the required axial load cycles during the service life with approx. $1.5 \times 10^8$ cycles for elastomer components are very high, only small deformations in the elastomer may occur in the axial direction. These cannot be transmitted by a conical bearing optimized for optimal torsional deformation.

Likewise, the rotor makes a constant pendulum motion to compensate for the pitch and yaw loads, so that here too the torsional loads occur with very large cycles. This means that the cone bearing has to be designed for long load cycles. This requires the smallest possible diameter and a small cone angle, which would be unsuitable for transmitting the axial forces. To transmit the axial forces with small elastomer deformations, the diameter and the taper angle would have to be large, which in turn would be bad for the high torsional loads.

The object has been achieved by the rotary bearing or the rotor hub as described in detail below and in the claims.

BRIEF DESCRIPTION OF THE DRAWINGS

The present subject matter will now be described in detail with reference to the drawings, which are provided as illustrative examples of the subject matter so as to enable those skilled in the art to practice the subject matter.

FIGS. 4A-C show a joint unit according in perspective view (a) and as a side view (b)(c), according to some examples described herein.

Figure 1:
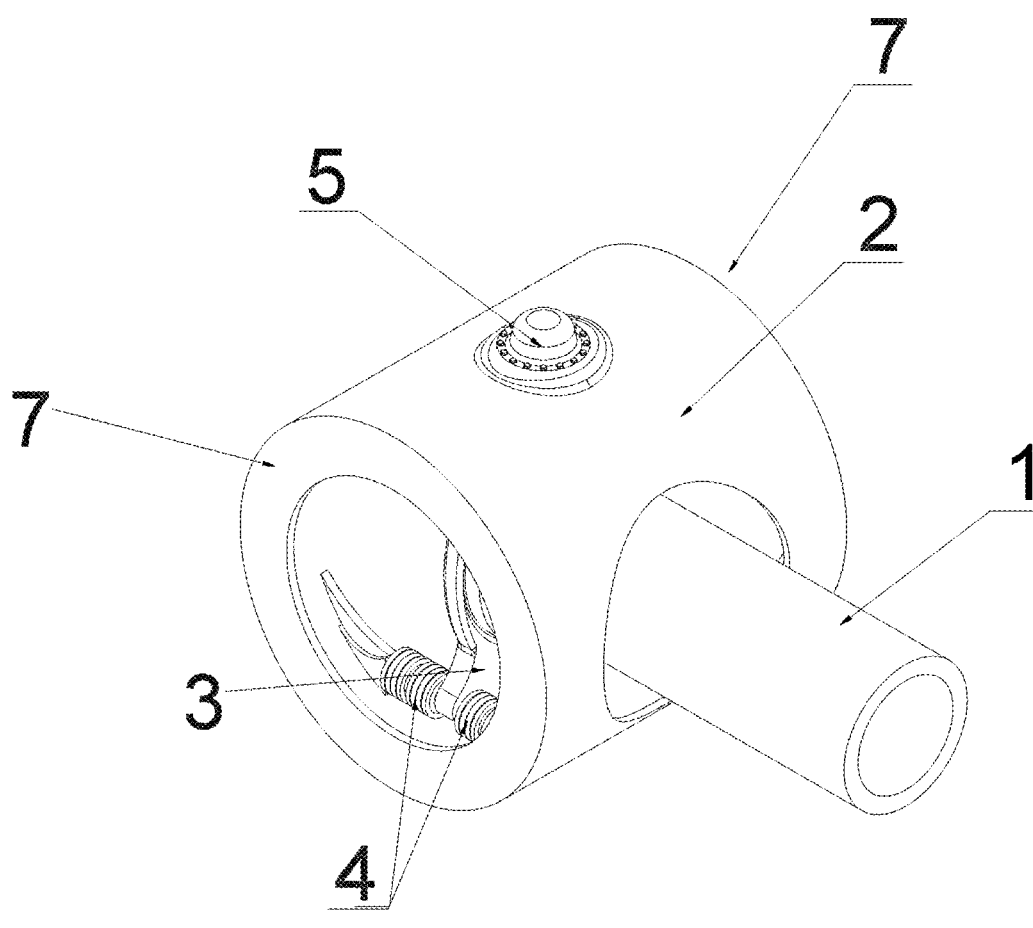
FIG. 1 is a rotor hub in perspective view, according to some examples described herein.

The invention thus relates to an elastic rotary bearing for a rotor hub with high load cycles for an elastically mounted two-blade rotor of a wind turbine, or a rotor hub having an elastic rotary bearing, the rotor being capable of performing a pendulum motion by an angle of rotation of at least 3° when under the action of simultaneously high axial and radial forces.

The rotary bearing according to the invention, as a constituent part of a novel rotor hub, comprises a first, inner component, which is firmly connected to the rotor shaft and thus to the structure of the wind turbine, and a second, outer movable component, which has connection regions for two opposing rotor blades, the first, firmly connected inner component and the second, movable outer component being connected to one another via two opposing rotational joint units, which are capable of absorbing torsional forces, in such a way that under the action of force the rotor blades connected to the rotor hub can be reversibly moved toward or away from the rotating structure of the wind turbine.

According to the invention, a rotor hub comprises two rotational joint units according to the invention which are arranged opposite one another within the rotor hub and are firmly connected to one another. Each of the two rotational joint units is substantially composed of:

(a) at least one conical bushing, which in each case comprises a plurality of, preferably six to ten, elastic layers for absorbing forces acting predominantly radially with respect to the cone axis, and has the smallest possible taper angle, for example not more than 15°, preferably less than 10°, due to the small available space requirement, and (b) at least one, preferably two elastic springs, preferably consisting of four to eight layers, which is arranged such that it has a common axis with the conical bushing and absorbs those axially acting forces which cannot be absorbed by the conical bushing.

In the cone elements and the layer-spring elements, the elastic layers are connected to one another by inelastic, solid layers, for example metal sheets.

In order to be able to install the first inner component into the second outer movable component, the external dimensions of the inner component have to be kept small. For this purpose, in an embodiment according to the invention the conical bushings can be designed to be removable. Bending moments are transmitted by means of a central screw or a plurality of screws arranged in a circle. The radial force is transmitted by an annular detachable guide (recess element) and correspondingly shaped cone elements.

The joint units according to the invention are designed such that the first, inner component, for example in the form of a carrier plate, which is firmly connected on two opposite sides to the innermost layer of each conical bushing, the cone axes being perpendicular to the axis of the rotor shaft, and the second, outer, movable component is firmly connected to the outermost layer of each conical bushing, so that under the action of force a reversible torsional deformation of the individual elastic layers of the conical bushing and possibly an axial/radial deformation of the particular layer springs takes place. This allows the aforementioned pendulum motion of the two-blade rotor.

The rotor hub having the rotary bearing according to the invention generally has two rotational joint units, which are located opposite one another. The two cone elements and the two layer-spring elements are preferably arranged along one and the same axis, each of the two cone elements having at least one layer-spring element with which it forms a structural unit. These cone-layer-spring units are preferably firmly connected to the rigid, non-movable component, for example a carrier plate, via connecting elements, for example bolts or pins whose ends are shaped according to the conical bushings. The two opposing conical bushings are so strongly braced against one another that, even under alternating loads caused by the rotor weight of the two-blade rotor, a residual preload is maintained in every state.

The layer-spring elements, which are mainly intended to transmit the axial forces, can be designed according to the invention as flat sandwich elements or as hemispherical elements. In the radial direction, the flat layer spring is very soft, with the result that no significant radial loads are transmitted. These loads are completely absorbed by the radially much stiffer conical bushing. In this way the taper angle, defined above and below as half the cone angle, and thus also the torsional movement in the elastomer elements, can be kept small, in particular between 5 and 15°.

Hemispherical elements, in contrast, are not quite as soft and can also transmit axial forces to a certain extent. In another embodiment of the invention, a flat sandwich element of the cone-layer spring unit is replaced by two opposite, preferably interconnected hemispherical elements. These elements are very stiff in the axial direction and have a small diameter, so that a large angle of rotation is possible with few layers. The radial displacement is thus made possible by the cardanic deformation of the two hemispherical elements which are mutually spaced apart by a pivot point.

Surprisingly, it was found that the effectiveness of the rotary bearing according to the invention with respect to radial and torsional deformation can be optimized by specifically changing layer thicknesses, layer lengths, and stiffnesses or Shore hardnesses of the material.

Therefore, the invention relates to a corresponding rotary bearing for a two-blade rotor, in which the outer elastic layers of the conical bushing have a lower Shore hardness than the inner elastic layers. Preferably, the Shore hardness increases continuously from layer to layer from outside to inside, for example by 2-5% per layer.

Furthermore, rotary bearings in which the inner elastic layers of the conical bushing have a greater thickness than the outer elastic layers are particularly advantageous. Preferably, the thickness of the layers decreases continuously from the inside to the outside, for example by 5-10% per layer.

Furthermore, it has been shown to also be advantageous—in respect of the limited space within the rotor hub—if the outer layers of the conical bushings are shorter than the inner layers, it being sufficient to shorten the three four outer layers.

In one embodiment of the invention, the outer layers of the conical bushings are shorter than the inner layers and have a lower stiffness or Shore hardness than the inner longer layers with higher stiffness.

In another embodiment of the invention, the outer layers of the conical bushings are shorter and have a smaller thickness than the inner layers.

Another embodiment of the invention combines shorter, thinner and softer outer layers with longer, thicker and harder inner elastic layers of the conical bushings. Such a conical bushing is optimized with respect to its radial and torsional deformation when force acts on the rotary bearing according to the invention.

The rotary bearing according to the invention is designed in such a way that, at least in the event of strong pendulum motions, the movable part of the rotor hub can strike the fixed part. In order to prevent damage and undesirable kickback effects, it is favorable to provide stop devices according to the invention, for example in the form of elastic dampers.

This is useful in the event that the angle of rotation becomes too large (e.g., >4°) due to external influences such as extreme gusts of wind or control errors. The stops can, for example, be arranged between the fixed and the movable components of the rotary bearing or the rotor hub. If the angle is too large, the task of the stops is then to gently absorb shocks. For example, hydraulic-damper cylinders of the prior art can be used for this purpose.

The described rotary bearings according to the invention, as an integral constituent part of rotor hubs of two-blade rotors, allow a reversible pendulum motion of the two-blade rotor toward the structure or the tower of the wind turbine at an angle of rotation of 3-5°, even in the case of high axial and radial loads on the two-blade rotor. This bearing, which is mounted in the rotor hub itself, requires only a small amount of space since the taper angle can be kept small. Furthermore, owing to the small diameter of the conical bushing, the elastomer layers experience little torsional movement, as a result of which a high number of torsional cycles are made possible even with relatively few elastic layers.

The invention is described in more detail below with reference to drawings.

FIG. 1 shows a typical rotor hub according to the invention in perspective view.

A rotor shaft (1) is firmly connected to a fixed component, in the example shown in the form of a carrier plate (3). The carrier plate (3) thus rotates with the rotor shaft. The carrier plate (3) is connected to two opposing joint units (5) (only one is shown). Furthermore, the joint units are connected to a component (2) which can move relative to the rotor axis and is designed in such a way that it accommodates in its interior the carrier plate (3) and the end piece of the rotor shaft. The component (2), which forms the outer shape of the rotor hub, is movably fastened to the joint units (5) and, when force acts on the rotor blades, executes the desired rotational movements toward the structure of the wind turbine. The rotor blades of the two-blade rotor (not shown) are attached to the connecting pieces (7) of the movable component (2). The component (2), which can move only about the axis of rotation, together with the two rotor blades, is limited in its movement relative to the fixed component (3) by elastic stop devices (4) inside said component.

Figures 2A, 2B:
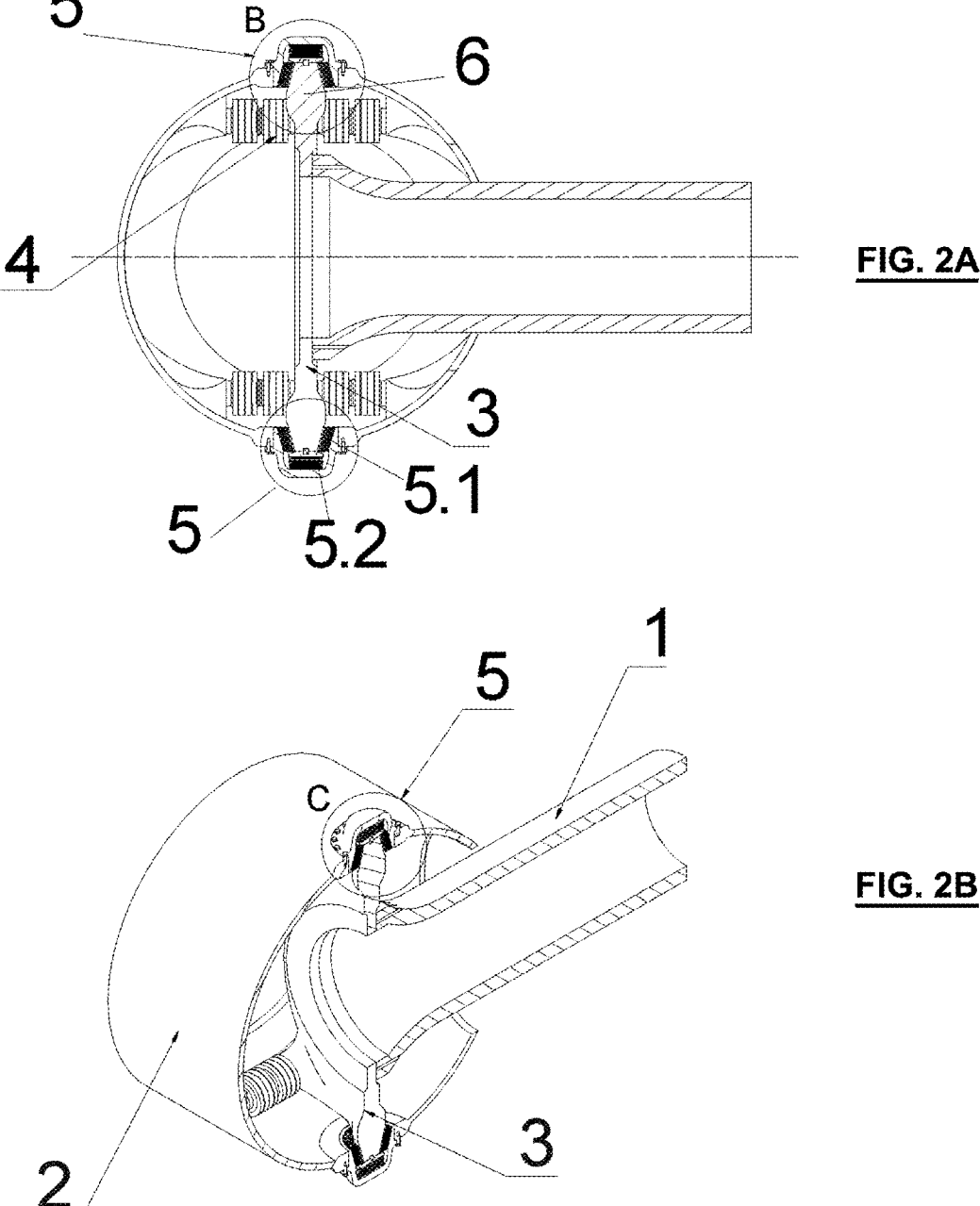
FIGS. 2A and 2B show the rotary bearing analogously to FIG. 1, with more details in a side view (a) and again in a perspective view (b), according to some examples described herein.

FIG. 2 shows the rotary bearing according to the invention, or rotor hub, analogously to FIG. 1, with more details in a side view (a) and again in a perspective view (b). FIG. 2 shows in particular the arrangement and design of the two opposing joint units (5) on the carrier plate (3). Each joint unit (5) consists of a conical bushing (5.1) and a layer-spring element (5.2). The conical bushings (5.1) are arranged so that their wide base points inward and their narrow base points outward, with the cone axis being identical to the longitudinal axis of the carrier plate (3). A flat layer-spring element (5.2) is arranged in each case outwardly above the narrow cone base and can thus absorb and transmit the axial forces. The carrier plate (3) and the joint elements (5.1) (5.2) are connected via pins or bolts (6) which are shaped according to the cone shape and are attached as an extension of the carrier plate (3). The pins (6) of the fixed carrier plate (3) are connected to the inner surface of the conical bushing (5.1), whereas the outer surface of the conical bushing is connected to the movable part (2), so that rotation of the components (2) and (3) relative to one another, and thus of the rotor blades relative to the structure, is made possible by reversible torsional deformation of the elastic conical bushings. Stop devices (4) are provided between the components (2) and (3) and limit the one-dimensional movement of the rotor blades (not shown) attached to the component (2).

Figure 3A:
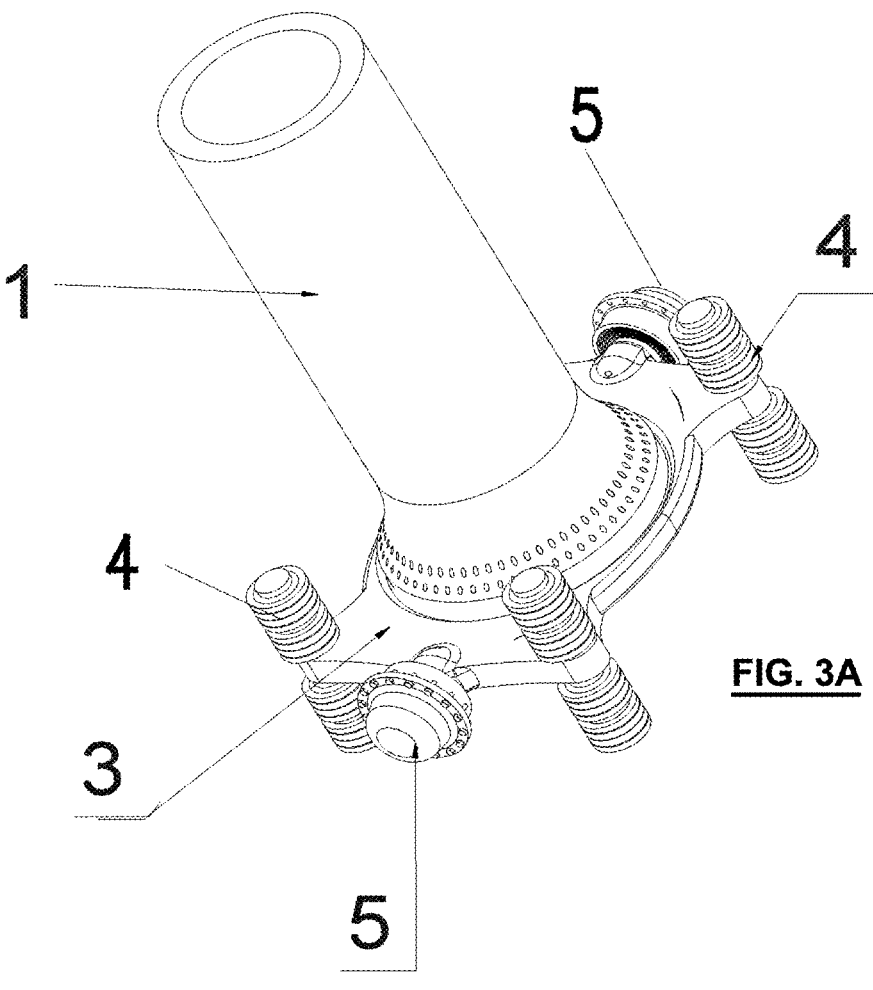
FIG. 3A shows a perspective view of a rotor shaft with a connected carrier plate, according to some examples described herein.

FIG. 3 (a) shows a perspective view of a rotor shaft (1) with the firmly connected carrier plate (3). The carrier plate (3) is in turn connected to the two joint units (5), specifically in such a way that the inner elastic cone surface is connected in each case via the connection pins (6) shown in FIG. 2 (not shown here). For reasons of better clarity, the movable part (2), which is connected to the particular outer cone surfaces of the two conical bushings (5.1), is not shown. The figure also shows three of four pairs of stop devices (4) for the movable part (2) and their arrangement on the carrier plate (3).

Figure 3B:
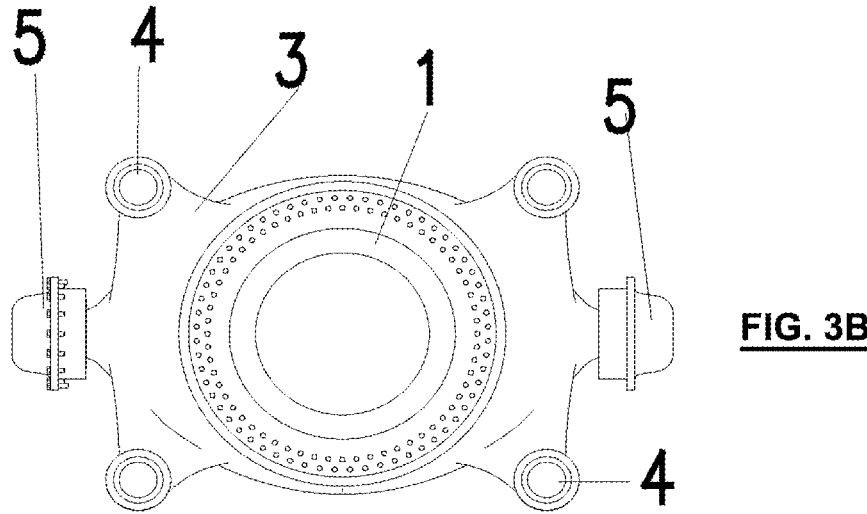
FIG. 3B shows a top view of the carrier plate, according to some examples described herein.

FIG. 3b shows a top view of the carrier plate (3) with two opposing joint units (5) according to the invention and how they are fastened; again, the movable component (2) has been omitted for the sake of clarity.

FIG. 4 shows a detailed representation of a joint unit (5) according to the invention in perspective view (a) and as a side view (b) (c).

A multi-layered cone element (5.1) with a taper angle (5.1.4) firmly encloses with its inner surface a pin or bolt (6) correspondingly shaped in this region, which in turn is firmly connected to the carrier plate (3) shown below.

Alternatively, however, as shown in FIG. 4 (c), the conical bushing can also be firmly but detachably connected to the pin (6) by means of a clamping screw (5.1.7) via a correspondingly shaped removable cone element (5.1.5), thus allowing easy replacement of the bushing and the pin. The removable cone element (5.1.5) rests in a circular guide (recess) (5.1.6).

Above the conical bushing, a layer-spring element (5.2) is arranged as a multi-layered sandwich element (5.2.1) such that the axes of the two components are identical. The axially acting layer-spring element (5.2) and the conical bushing (5.1) are surrounded by a housing (5.3). The housing (5.3) is firmly connected on the inside to the outer surface of the conical bushing (5.1) and on the outside to the movable component (2).

Thus, an elastic torsional/rotational movement of the movable part (2) relative to the fixed part (3) can take place on the cone under the action of force; this is equivalent to a rotational movement of the two-blade rotor relative to the axis of the rotor shaft toward the rotating structure of the wind turbine. FIG. 4 also shows the other essential geometric dimensions (5.1.1)(5.1.2)(5.1.3) of the conical bushings used for optimum effect.

Figures 5A, 5B:
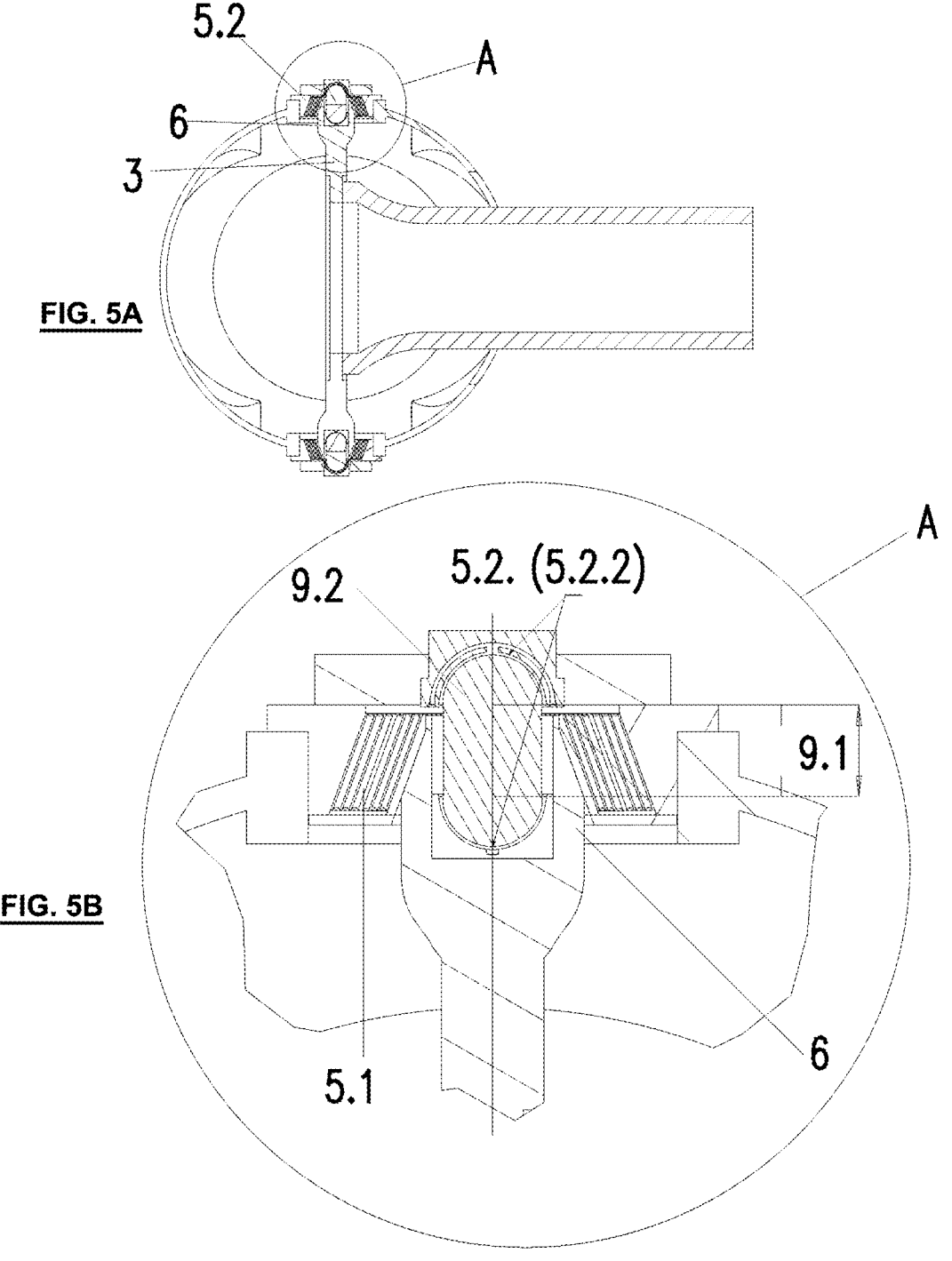
FIGS. 5A and 5B show another embodiment of a rotor hub, according to some examples described herein.

FIG. 5 (*a*)(*b*) shows a further embodiment of the invention.

In contrast to the representation according to FIG. 4, the flat sandwich element (5.2) is replaced by two axially opposite hemispherical shells (5.2.2), which are connected to one another other via a correspondingly shaped core or bolt (9.2). The distance between the hemisphere pivot points is given by the position (9.1).

This arrangement allows additional axial and radial displacement of the elastic components.

Figure 6:
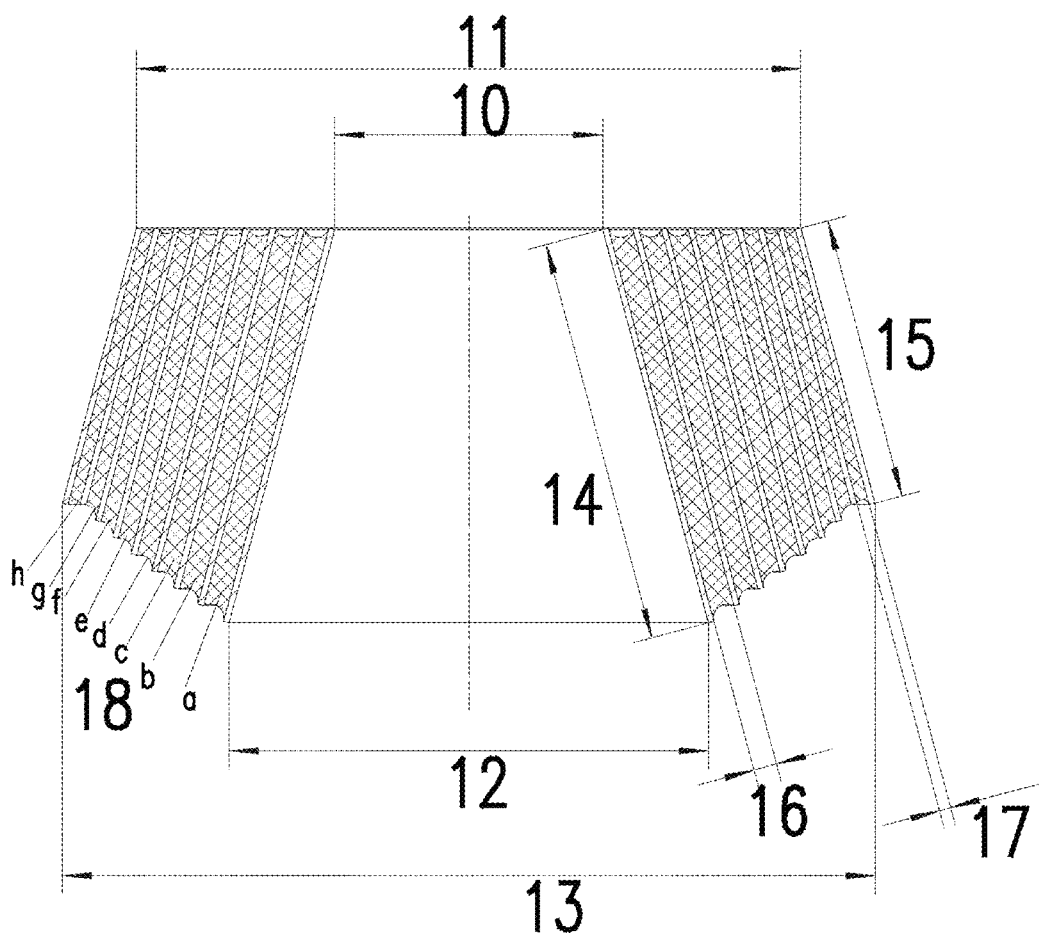
FIG. 6 shows a rotary bearing with a conical bushing, according to some examples described herein.

FIG. 6. shows in detail a conical bushing (5.1) as a constituent part of the rotary bearing according to the invention in side view as it is used in an optimized embodiment of the invention. The conical bushing consists of eight elastic layers (18) (a-h), which are separated from one another by firmly connected metal sheets. In principle, bushings with 6-10 layers are also suitable. The thickness of each layer decreases from layer to layer from the inside to the outside. The innermost layer a thus has the greatest thickness (16), while the outermost layer h has the smallest thickness (17). Furthermore, the cone length (14) of the innermost layer a is greater than the subsequent layer b, which in turn is greater than the outermost layer c, etc. The innermost layer a can thus have a length (14) up to 30% greater than the length (15) of the outermost layer h.

In a particular embodiment of such conical bushings, the different layers (18) also have different Shore hardnesses, the Shore hardness of the layers (18) increasing from the outside to the inside by 2-5% per layer. Such bushings exhibit optimal properties with regard to radial and torsional deformation of the individual elastic layers. The conical bushing (5.1) is further characterized by the stated smaller and larger, inner and outer diameters (10)(11)(12)(13).

The invention claimed is:

1. A rotary bearing for load cycles as an integral constituent part of a rotor hub, comprising a first, inner component in the shape of a carrier plate, which is firmly connected to a rotor shaft and thus to a rotating structure of the wind turbine, and a second, movable outer component, which has connection regions for two opposing rotor blades, the first inner component and the second, movable outer component being connected to one another via a first and second rotational joint unit in such a way that under the action of force the two rotor blades connected to the rotor hub can be reversibly moved toward or away from the rotor shaft, wherein (i) each of said first and said second rotational joint units is composed of:

(a) at least one conical bushing, wherein each conical bushing comprises a plurality of elastic layers for absorbing forces acting predominantly radially with respect to a cone axis of the rotor shaft and has a taper angle, and (b) at least one elastic layer spring, which is a flat sandwich element that forms a structural unit with the at least one conical bushing of the respective rotational joint unit, or is formed by at least one such that it has a common axis with the at least one conical bushing and absorbs axially acting forces of the rotor shaft that are not absorbed by the respective at least one conical bushing, (ii) said first and said second rotational joint unit are arranged opposite one another and are firmly connected to one another via the first, inner component, (iii) the first inner component and the at least one conical bushing and the at least one elastic layer spring of each rotational joint unit are connected via pins or bolts which are attached as an extension of said first inner component, (iv) the first inner component, is firmly connected on two opposite sides thereof to an innermost layer of the plurality of elastic layers of the at least one conical bushing of each rotational joint unit, an axis of each conical bushing being perpendicular to the cone axis of the rotor shaft, and (v) the second, movable outer component is firmly connected to an outermost layer of the plurality of elastic layers of the at least one axially acting hemispherical element, wherein each elastic layer spring is arranged conical bushing of each rotational joint unit, so that under the action of force a reversible torsional deformation of the individual elastic layers of the conical bushings and/or a torsional deformation of the layer springs takes place.

2. The rotary bearing according to claim 1, wherein the taper angle of the at least one conical bushing is less than 15°.

3. The rotary bearing according to claim 2, wherein the taper angle is 8-12°.

4. The rotary bearing according to claim 1, wherein the plurality of elastic layers includes six to ten layers, which are separated from one another by inelastic elements.

5. The rotary bearing according claim 1, wherein the at least one elastic layer spring is composed of 3 to 8 elastic layers which are separated from one another by inelastic elements.

6. The rotary bearing according to claim 1 wherein the at least one elastic layer spring is formed by the at least one axially acting hemispherical element and includes two hemispherical elements arranged axially opposite one another with a spacing and form, together with a corresponding one of the conical bushings, a rotational joint unit of the at least two rotational joint units, the hemispherical elements being connected to one another by a correspondingly shaped solid core.

7. The rotary bearing according to claim 1, wherein the first inner component is connected to the innermost layer of the plurality of elastic layers of said conical bushings of said rotational joint units via the pins or bolts in a region of the conical bushings.

8. The rotary bearing according to claim 1, wherein the conical bushings are detachably connected to the pins or bolts by means of a clamping screw via a removable cone element in an interior of the conical bushings.

9. The rotary bearing according to claim 8, wherein the removable cone element rests in a circular recess.

10. The rotary bearing according to claim 9, wherein a Shore hardness of the layers increases from outside to inside by 2-5% per layer.

11. The rotary bearing according to claim 9, wherein the thickness of the plurality of elastic layers decreases from inside to outside by 5-10% per layer.

12. The rotary bearing according to claim 1, wherein the outer elastic layers of the plurality of elastic layers of the at least one conical bushing have a lower Shore hardness than the inner elastic layers of the plurality of elastic layers.

13. The rotary bearing according to claim 1, wherein the inner elastic layers of the plurality of elastic layers of the at least one conical bushing have a greater thickness than the outer elastic layers of the plurality of elastic layers.

14. The rotary bearing according to claim 1, wherein the outer layers of the plurality of elastic layers of the at least one conical bushing are shorter than the inner elastic layers of the plurality of elastic layers.

15. The rotary bearing according to claim 1 comprising a plurality of stop devices which are arranged between the second movable outer component and the first inner component.

16. A rotor hub for a two-blade rotor, wherein it has a rotary bearing according to claim 1.

17. A wind turbine comprising a tower, a generator and a two-blade rotor capable of pendulum motion, wherein the two-blade rotor has a rotor hub according to claim 16.

* * * * *